United States Patent [19]

Iwabe et al.

[11] Patent Number: 4,507,678
[45] Date of Patent: Mar. 26, 1985

[54] AUTOREGISTRATION SYSTEM FOR COLOR TV CAMERAS

[75] Inventors: Kazuki Iwabe, Kodaira; Wataru Noguchi, Hachioji, both of Japan

[73] Assignee: Hitachi Denshi Kabushiki Kaisha, Tokyo, Japan

[21] Appl. No.: 409,832

[22] Filed: Aug. 20, 1982

[30] Foreign Application Priority Data

Aug. 28, 1981 [JP] Japan ................ 56-134274
Feb. 26, 1982 [JP] Japan ................ 57-29068
Apr. 1, 1982 [JP] Japan ................ 57-52278

[51] Int. Cl.³ .............................. H04N 9/09
[52] U.S. Cl. .................................. 358/51
[58] Field of Search ........................ 358/51

[56] References Cited

U.S. PATENT DOCUMENTS 4,285,004 8/1981 Morrison et al. ............ 358/51

FOREIGN PATENT DOCUMENTS 0011677 8/1979 European Pat. Off.
2454238 7/1980 France.
1266336 3/1972 United Kingdom.
1272970 5/1972 United Kingdom.

Primary Examiner—Richard Murray
Attorney, Agent, or Firm—Oblon, Fisher, Spivak, McClelland & Maier

[57] ABSTRACT

An autoregistration system is disclosed for a color television camera equipped with a plurality of image pickup devices so as to combine picture signals obtained through the plurality of channels from the plurality of image pickup devices into a composite color television signal. The autoregistration system comprises means for producing a level difference signal representing a predetermined difference in level between the picture signals of desired two channels, between which a picture image registration is to be carried out, and a first and second edge signals of the two channels; and means for subjecting the level difference signal and first and second edge signals to an operational processing to obtain a discriminatory signal representing the direction of a registration offset between the picture signals of the two channels. The above autoregistration system is employed to perform with ease the registration automatically whenever needed, without need for any special optical pickup unit having a built-in test pattern. The autoregistration system is particularly suited for portable color TV cameras which are frequently exposed to varying use conditions. Owing to the obviation of such a special optical pickup unit, the autoregistration system is small in size and low in manufacturing cost.

5 Claims, 10 Drawing Figures

AUTOREGISTRATION SYSTEM FOR COLOR TV CAMERAS

BACKGROUND OF THE INVENTION

This invention relates to a system for automatically carrying out the registration of picture images obtained on the basis of picture signals from different image pickup devices of a color television camera.

As image pickup systems for color televisions, there have heretofore been employed extensively an image pickup system equipped with a plurality of image pickup devices, for example pickup tubes having different spectral sensitivity characteristics so as to combine picture signals obtained from the plurality of pickup tubes into a composite color picture signal. In image pickup systems of the above type, it is necessary to accurately carry out the superposition, in other words, registration of picture images obtained on the basis of picture signals from the plurality of pickup tubes.

The above registration may generally be effected by the size control, that is to make the scanned area of an optical image to be picked up by each image pickup device coincided, the correction of geometrical distortion developed by variations in the optical pickup unit and image pickup unit, the centering operation to align the relative positions of scanned areas, and the like. As a system for effecting the aforementioned registration, such a manual registration system as shown in FIG. 1 has been principally relied upon.

In FIG. 1, numerals 1, 2 and 3 indicate respectively a G(green) channel image pickup system, R(red) channel image pickup system and B(blue) channel image pickup system. There is shown at numeral 4 a view finder (or monitor). Designated at numerals 2v, 3v are respectively knob units for effecting the registration. The operator manipulates the knob units 2v, 3v anytime whenever needed while watching picture images in the view finder 4 so as to bring the R and B picture images into registration with the reference picture image, G picture image.

The above prior art system is accompanied by such drawbacks that it is complex and cumbersome to operate and requires considerably long time for adjustment.

The aforementioned conventional registration system is susceptible of developing color variations notably when the use conditions of television cameras change. Among such use conditions, the surrounding temperature is predominant and its variations frequently lead to objectionable color variations, thereby requiring frequent readjustment while using television cameras. Accordingly, the aforementioned manual registration system does not permit satisfactory registration and is unable to provide picture signals of excellent quality.

With a view toward solving the above-mentioned drawbacks of the prior art registration system, so-called autoregistration systems have been proposed and actually employed on a large scale so as to effect the registration automatically whenever it is needed.

An example of such autoregistration systems are shown in FIG. 2, in which numerals 1-3 indicate image pickup systems of different channels as in FIG. 1. Designated at numeral 5 is a test pattern for registration. Numerals 6, 7 are preprocessing circuits while binarization circuits are shown at numerals 8, 9. Intermediate processing circuits are shown at numerals 10, 11. Designated at numeral 12 is a pulse comparator. Numerals 13 and 14 indicate respectively a postprocessing circuit and control circuit. Registration correction units are indicated respectively at numerals 15, 16. Numeral 17 designates a double throw switch.

The test pattern 5 bears thereon a special pattern suitable for registration and is included in the optical pickup unit for the image pickup systems 1-3 of the three channels. The optical pickup unit is constructed in such a way that the pattern 5 is projected on the targets of the image pickup systems 1-3 only when the registration is effected.

The preprocessing circuits 6, 7 are circuits to perform processing of signals such as non-linear amplification and signal clamping (in order to ensure their binarization).

The binarization circuits 8, 9 each outputs a signal "0" or "1" depending on each signal to be fed thereto.

The intermediate processing circuits 10, 11 are circuits to perform operational processing which is required for pulse comparison.

The pulse comparator 12 compares a pulse input through one channel with another pulse input through another channel so as to determine the interval between the former and latter channels and then to output a signal representing the off-set in registration.

The postprocessing circuit 13 serves to perform such processing as error checking or the like.

The control circuit 14 delivers a control signal to a registration correction unit 15 or 16 in accordance with the signal representing the off-set in registration, whereby bringing the image pickup system 2 or 3 into registration with the G-channel image pickup system 1. The control circuit 1 may be formed of a microcomputer or the like.

The double throw switch 17 changes the R-channel registration to the B-channel registration and vice versa.

Operation of the above autoregistration system will next be described. When effecting the registration, the test pattern 5 is advanced into the light path of the optical pickup unit and the resulting pattern images are projected respectively on the targets of the image pickup systems 1-3 of the different channels.

Then, a picture signal of the test pattern 5 obtained from the G-channel image pickup system 1 is input through the preprocessing circuit 6 to the binarization circuit 8, and, after wave-shaped into a pulse-like form at the intermediate processing circuit 10, delivered as a pulse-shaped picture image to the pulse comparator 12.

On the other hand, supposing that the double throw switch 17 has been changed over to the R-channel side as illustrated in the drawing, a picture signal of the test pattern 5 obtained by the R-channel image pickup system 2 is passed through the preprocessing circuit 7 and binarization circuit 9 to the intermediate processing circuit 11, where the picture signal is wave-shaped into a pulse-like form, and then fed to the pulse comparator 12 in the same way as the picture signal from the G-channel.

The shift between the pulsated signals fed to the pulse comparator 12 corresponds to the off-set between the picture signal obtained at the G-channel image pickup system 1 and that yielded at the R-channel image pickup system 2. Thereafter, the control circuit 14 receives through the post-processing circuit 13 a signal from the pulse comparator 12, whereby to change the control signal which has been delivered to the registration correction unit 15 of the R-channel so that the pulsated signal input through the R-channel to the pulse comparator 12 coincides in timing with that fed as an input through the G-channel. The registration operation of the R-channel relative to the G-channel has now been automatically carried out.

Next, by turning the double throw switch 17 to the B-channel, the control signal to the registration correction unit 16 of the B-channel can be similarly changed and the registration operation of the B-channel relative to the G-channel is automatically carried out. Incidentally, use of a microcomputer as the control circuit 14 enables to perform all the above operations in accordance with a program stored in the microcomputer.

According to the autoregistration system depicted in FIG. 2, the registration can be readily readjusted in a short time period whenever needed and composite color television signals of excellent quality can be always obtained with accurate registration.

However, the prior art autoregistration system as shown in FIG. 2 requires a special optical pickup unit with the test pattern 5 built in exclusively for registration and, hence, it is accompanied by such drawbacks that the system tends to become voluminous and correspondingly costly.

In television cameras of the above system, their picture signals are field interlaced in most instances. The distance between each two adjacent scanning lines in each field is an integer times, for example, double that in each frame. Accordingly, the scanning lines in each field are relatively coarse. In order to carry out an registration operation in the vertical direction in the aforementioned autoregistration system, it is thus necessary to collect as samples picture signals along a desired vertical line in a section preselected at a central portion of the picture image and to perform the registration on the basis of the thus-sampled picture signals.

Accordingly, the registration in the vertical direction is carried out, in the above-mentioned autoregistration system, on the basis of picture signals on the relatively coarse scanning lines in each field. Although the above autoregistration system seems to promise sufficiently accurate operations, it is still accompanied by another drawback that it is difficult to obtain a sufficiently high level of registration accuracy in the vertical direction.

SUMMARY OF THE INVENTION

An object of this invention is to solve the above-described drawbacks of the prior art systems and to provide an autoregistration system in which an accurate registration operation is automatically carried out shooting a general object without need for any special optical pickup unit with a test pattern built in exclusively for registration.

Another object of this invention is to overcome the above-mentioned drawbacks of the prior art systems and to an autoregistration system capable of performing an registration operation in the vertical direction with sufficient accuracy even in a television image pickup system of the field interlace system.

In order to achieve the above objects, the present invention provides an autoregistration system for a color television camera equipped with a plurality of image pickup devices so as to combine picture signals obtained through the plurality of channels from the plurality of image pickup devices into a composite color television signal, which system comprises:

means for producing a level difference signal representing a predetermined difference in level between the picture signals of desired two channels, between which a picture image registration is to be carried out, and a first and second edge signals corresponding to each of the picture signals of the two channels; and means for subjecting the level difference signal and first and second edge signals to an operational processing to obtain a discriminatory signal representing the direction of a registration offset between the picture signals of the two channels.

The above system according to this invention may employ a memory capable of storing picture signals corresponding to a plurality of fields so that it is feasible to pick up, as samples, signals required for the registration in the vertical direction from the picture signals making up one frame.

Since the autoregistration system according to this invention makes it possible to carry out with ease the registration automatically, without need for any special optical pickup unit having a built-in test pattern, whenever needed, it has solved the aforementioned drawbacks of the prior art registration systems and is capable of maintaining accurate registration in not only image pickup apparatus of the studio type but also those exposed to significantly varying use conditions and susceptible of developing offset registration such as portable television cameras. Accordingly, the present invention can provide small and inexpensive autoregistration systems capable of obtaining composite color television signals of excellent quality.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
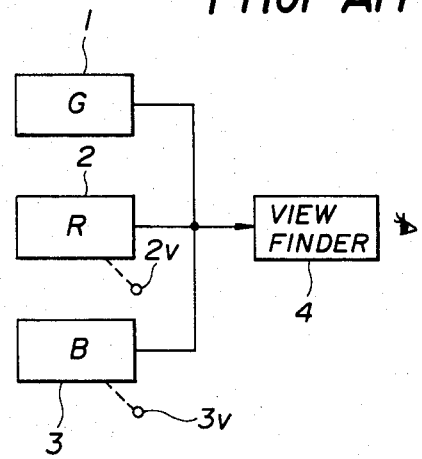
FIG. 1 is a simplified block diagram of the registration system in a prior art color television camera.
Figure 2:
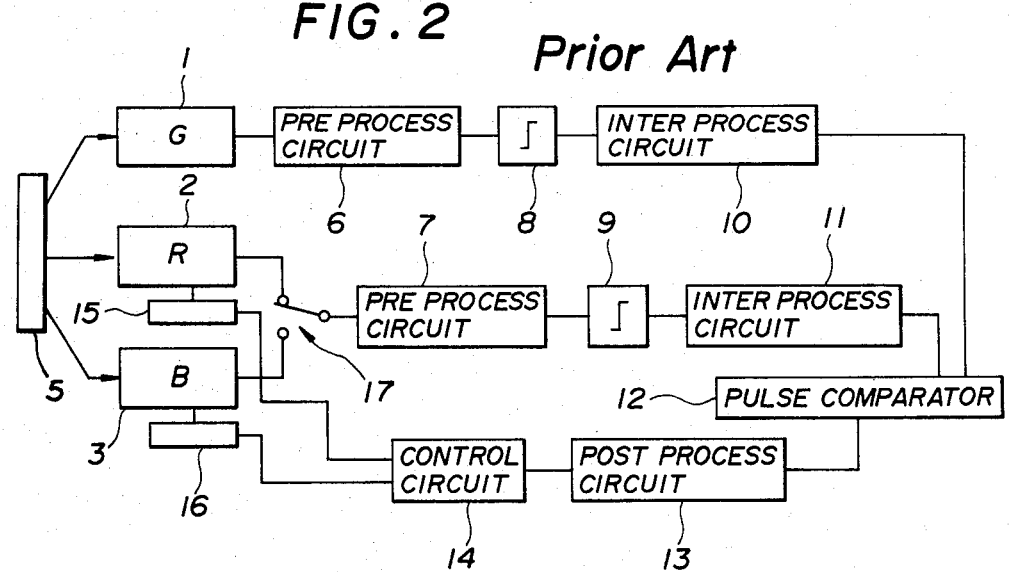
FIG. 2 is a block diagram of a conventional autoregistration system.
Figure 3:
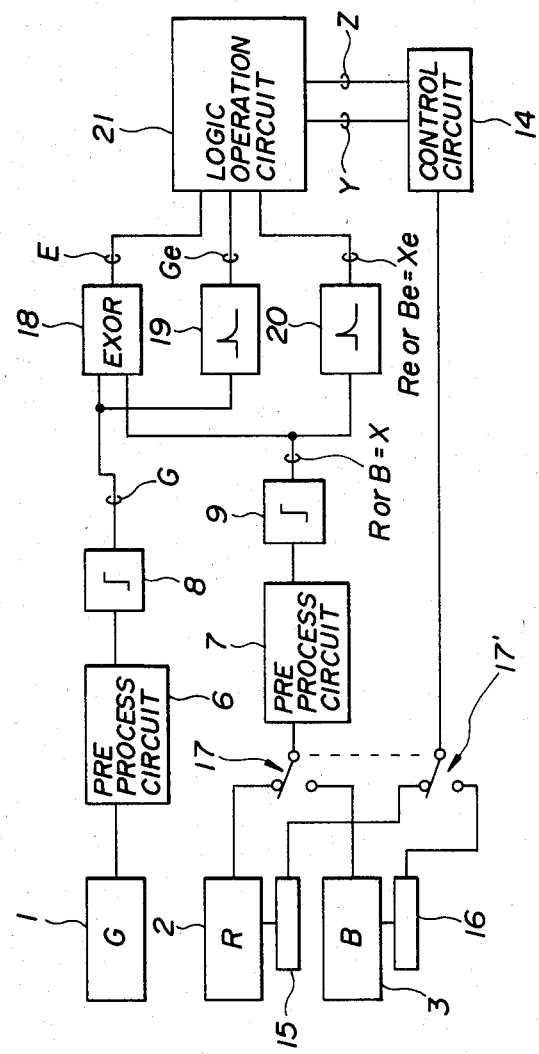
FIG. 3 is a block diagram of one embodiment of the autoregistration system according to this invention.

FIG. 3 illustrates, as mentioned above, one embodiment of the autoregistration system according to this invention, in which the same or equivalent circuits, units and elements as those employed in the prior art autoregistration system shown in FIG. 2 are identified by like reference numerals and their detailed description will be omitted.

In FIG. 3, there is shown at numeral 18 a comparator. Numerals 19, 20 indicate respectively a first and second edge signal generating circuits, while numeral 21 designates a logic circuit. In the present embodiment, the double throw switch 17 is not of the single circuit—double contacts structure but of the double circuits—double contacts structure and the other double throw switch, associating with the double throw switch 17, is shown at numeral 17'.

The comparator 18 is a circuit that outputs a level difference signal E only when the difference in level between a binarized signal G, resulted upon processing a picture signal of the G-channel from the preprocessing circuit 6 at the binarization circuit 8, and a binarized signal R or B obtained by processing a picture signal of the R- or B-channel from the preprocessing circuit 7 at the binarization circuit 9 becomes more than a predetermined value. It may be considered as a window comparator or, because the thus-input signals or the G-channel and R- or B-channel have been binarized, an "exclusive or" circuit.

The edge signal generation circuits 19, 20 output respectively edge signals Ge and Xe in synchronization with edge portions of the binarized picture signals G and R or B (R or B will hereinafter be called "X"). They may for example be formed individually of a differentiating circuit and wave-shaping circuit.

The logic circuit 21 performs an operation in accordance with either one of the following three types of logical equations using the level difference signal E and edge signals Ge and Xe as its inputs and outputs two kinds of discriminatory signals Y, Z.

| | |
|---|---|
| Logic (A) | Y = E · Ge + $\bar{E}$ · Xe |
| | Z = E · Xe + $\bar{E}$ · Ze |
| Logic (B) | Y = E · Ge |
| | Z = E · Xe |
| Logic (C) | Y = $\bar{E}$ · Ge · $\bar{Xe}$ + E · $\bar{Ge}$ · Xe |
| | Z = $\bar{E}$ · $\bar{Ge}$ · Xe + E · Ge · $\bar{Xe}$ |

In the case of Logic (A), the logic circuit 21 may for example be formed of four AND circuits, one inverter and two OR circuits. To perform an operation in accordance with Logic (B), it may be possible to form the logic circuit 21 with two AND circuits. In the case of Logic (C), the logic circuit 21 may be formed, for example, of four 3-input AND circuits, three inverters and two OR circuits, or of one 3-input/8-output decoder and two OR circuits.

Incidentally, the double throw switch 17' is adapted to change over the supply of control signals to the registration correction units 15, 16 of the R- and B-channels in synchronization of each change-over of the double throw switch 17.

The operation of the autoregistration system of the above embodiment will next be described with reference to the timing charts shown in FIGS. 4-6.

Figure 4:
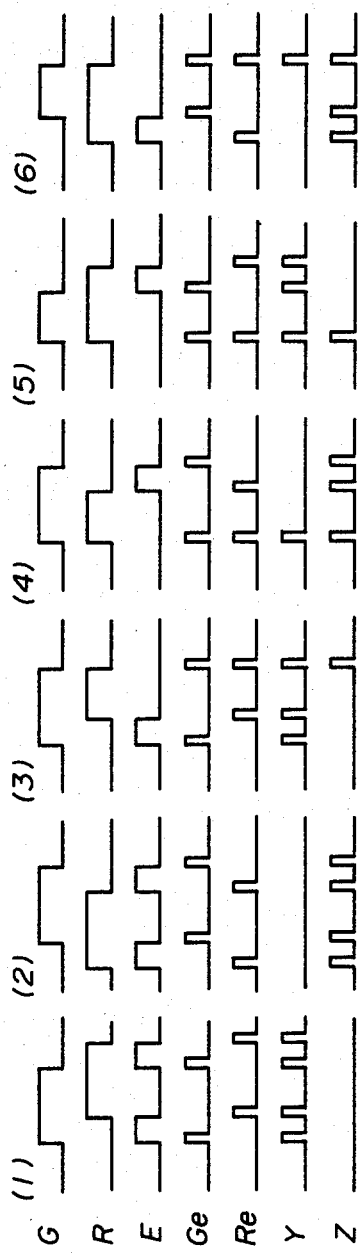
FIGS. 4–6 are each waveform diagrams to which reference will be made in explaining the operation of the autoregistration system according to this invention.
Figure 4:
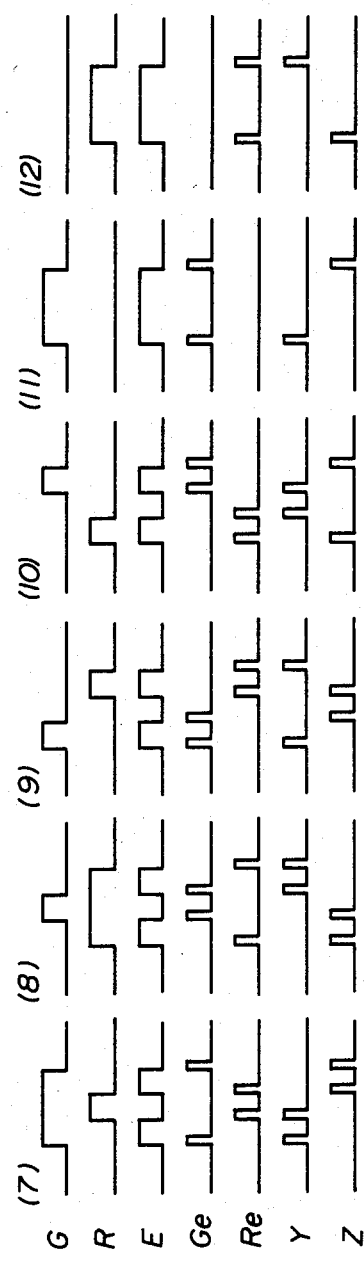
Figure 5:
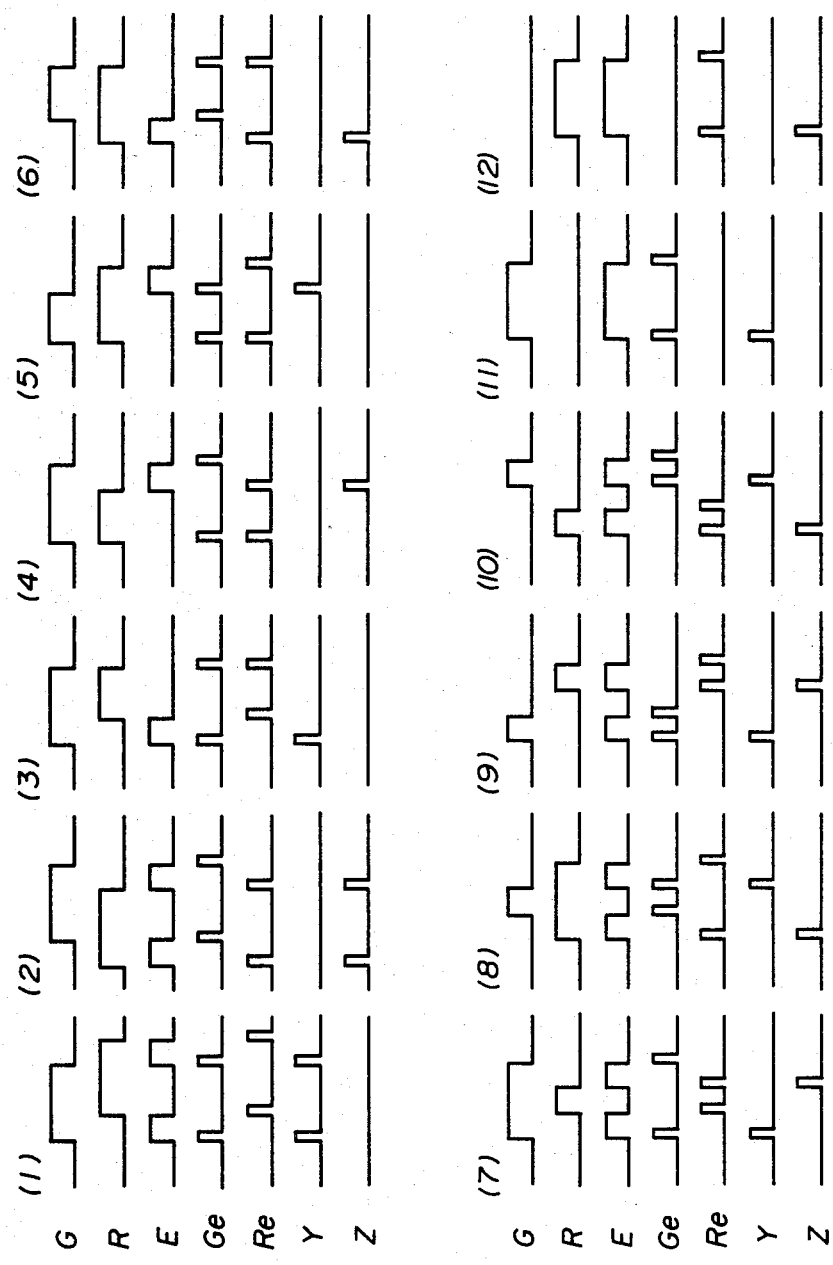
Figure 6:
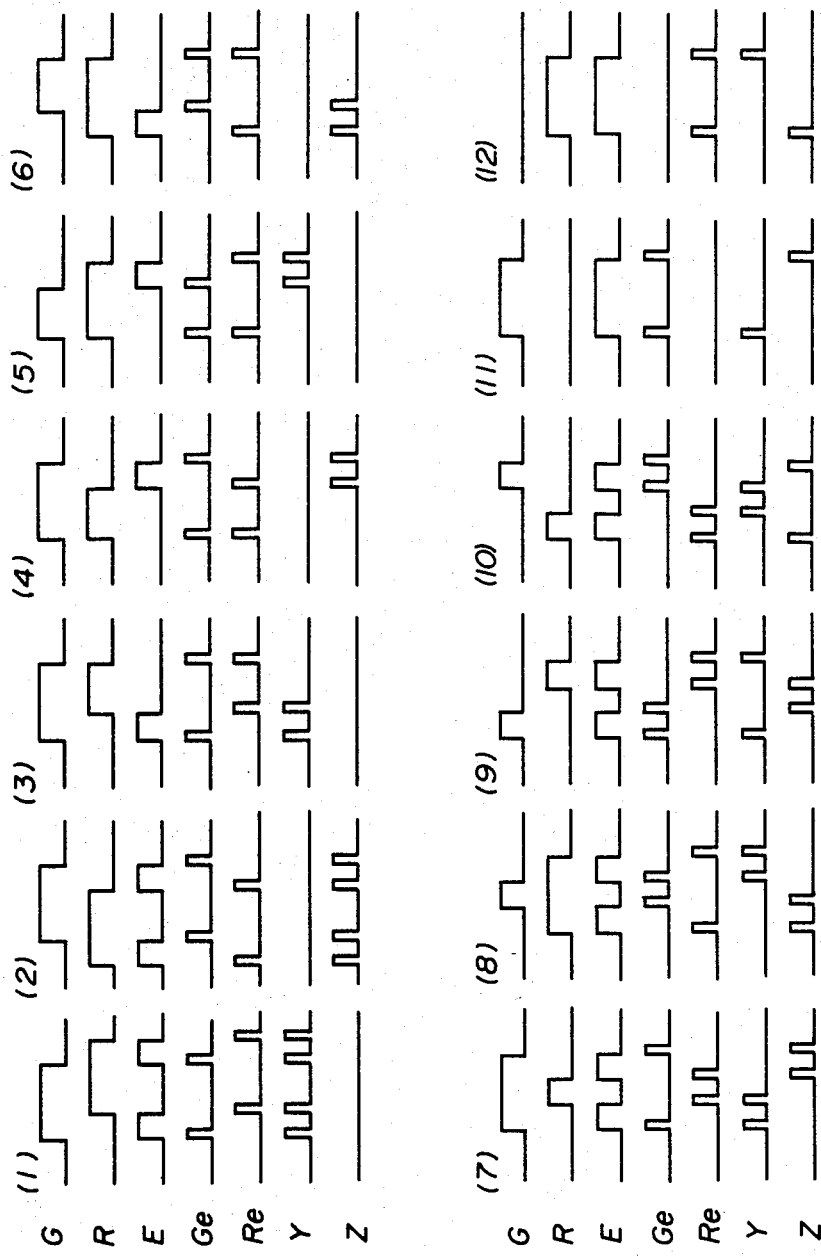

Among these timing charts, FIG. 4 corresponds to an autoregistration system in which the logic circuit 21 is so constructed as to perform operations in accordance with Logic (A) and FIGS. 5 and 6 corresponds respectively to Logic (B) and Logic (C). In each of the three cases, the operation will be carried out in an analogous way. Thus, these three cases will hereinafter be described together.

First of all, let's suppose that the switches 17, 17' have been turned to R-channel as illustrated in FIG. 3.

Then, the binarization circuit 9 outputs a picture signal from the R-channel pickup system 2 as a binarized signal R as illustrated in each of FIGS. 5 and 6 (hereinafter merely called "the drawing"). The binarized signal R is then processed at the edge signal generating circuit 20 and an R-channel edge signal Re appears as its output as illustrated in the drawing.

On the other hand, irrespective of the change-over positions of the switch 17, 17', the binarization circuit 8 outputs the image signal from the G-channel pickup system 1 as a binarized signal G as shown in FIG. 4. The binarized signal G is then processed at the edge signal generating circuit 19 and a G-channel edge signal Ge appears as its output as illustrated in the drawing.

At the same time, the binarized signals G and R, which have been output as G-channel and R-channel picture signals from these binarization circuits 8, 9, are input to the comparator 18 and, only when there is a difference of the predetermined value or more in level between the signal G and signal R, the comparator 18 outputs a signal, i.e., the level difference signal E as shown in the drawing.

Thereafter, these edge signals Ge and Re and level difference signal E are delivered to the logic circuit 21, where an operational processing is performed on the thus-input signals in accordance with either one of the aforementioned three types of logics, i.e., Logic (A), Logic (B) and Logic (C), thereby producing as its outputs two kinds of discriminatory signals, i.e., discriminary signal Y and discriminatory signal Z as depicted in the drawings (Logics (A), (B) and (C) correspond respectively to FIGS. 4, 5 and 6). The discriminatory signals Y and Z are thereafter fed to the control circuit 14. Since the discriminatory signals Y and Z here represent the direction or offset of the picture image of the R-channel relative to the reference picture image of the G-channel as will hereinafter explained, the control circuit 14 outputs a control signal in accordance with the discriminatory signals Y and Z. The control signal is then delivered through the switch 17' to the registration correction unit 15 to change the deflection characteristics of the R-channel pickup system 2 in such a way that the picture image of the R-channel will be registered with the reference picture image of the G-channel. Thus, the registration offset has been automatically corrected.

When the picture image of the R-channel has been brought into registration with the reference picture image of the G-channel, the switches 17, 17' are turned in the opposite direction to that shown in FIG. 3, i.e., to the B-channel side. This permits to perform the registration of the picture image of the B-channel with the reference picture image of the G-channel in the same way as the R-channel. Now, the registration has been completed.

Next, the discriminatory operation of each registration offset by virtue of the discriminatory signals Y and Z will be described in further detail depending on the extent of the registration offset.

Among the registration operation, the centering operation will first of all be described.

In each of FIGS. 4 to 6, the picture image of a comparative channel to be centered with respect to the reference channel, namely, the G-channel, for instance the picture image of the R-channel is out of registration as illustrated in the charts (1)-(6). In the charts (1) and (2), the levels of the picture signals of the G-channel and R-channel are substantially in the same state. Thus, their corresponding binarized signals G and R have the same pulse width. In the charts (3) and (4), the level of the picture signal of the R-channel is lower than that of the G-channel and the binarized signal G is a broader pulse than the binarized signal R. On the other hand, in the charts (5) and (6), the level of the picture signal of the R-channel is higher than that of the G-channel and the pulse width of the binarized signal R is broader than that of the binarized signal G. In each of the above situations, the pulse number $Y_n$ of the discriminatory signal Y is not equal to the pulse number Z of the discriminatory signal Z. When the picture image of the R-channel is shifted to the right on a picture monitor, in other words, in the cases represented by the charts (1), (3) and (5), $Y_n > Z_n$. On the other hand, when the picture image of the R-channel is shifted to the left on the picture monitor, in other words, in the cases represented by the charts (2), (4) and (6), $Y_n < Z_n$.

Charts (7) and (8) represent individually a situation in which the picture image of the R-channel is in registration with that of the G-channel. In chart (7), the level of the picture signal of the G-channel is higher than that of the R-channel. On the other hand, chart (8) represents a situation in which the level of the picture signal of the R-channel is higher than that of the G-channel on the contrary. However, in each of the situations, the pulse numbers $Y_n$ and $Z_n$ appearing as the discriminatory signals Y and Z satisfy the following equation: $Y_n = Z_n$.

Thereafter, the control circuit 14 receives as its inputs the discriminatory signals Y, Z from the logic circuit 21 and compares their pulse numbers $Y_n$ and $Z_n$. When $Y_n > Z_n$, a control signal is output. On ther other hand, when $Y_n < Z_n$, another control signal which is opposite to the former control signal is output. The control signals are fed to the centering correction unit 15 through the double throw switch 17', whereby to change the scanning area of the R-channel pickup system 2 and, when $Y_n > Z_n$, the R-channel pickup system 2 is controlled so as to shift the signal R leftwards and, when $Y_n < Z_n$ on the contrary, the R-channel pickup system 2 is controlled in such a manner as to move the signal R rightwards so that $Y_n$ becomes equal to $Z_n$(i.e., $Y_n = Z_n$). The above operation permits to perform an automatic centering of the R-channel with respect to the G-channel.

In the charts (7) and (8), there is a difference in level between the picture signal of the G-channel and that of the R-channel. Due to the above difference, the pulse width of the signal G is different from that of the signal R. If the picture signals of these channels have the same level and the signals G and R have the same pulse width, the level difference signal E becomes "0". In this case, the edge signals Ge and Re are output as discriminatory signals Y and Z from the logic circuit 21 as they are. Hence, needless to say, the relationship $Y_n = Z_n$ which is the discriminatory condition representing the achievement of centering is fulfilled in the above case.

After the R-channel has been centered to the G-channel, the switches 17, 17' are then turned to the B-channel side. This permits to carry out the automatic centering of the B-chahnnel to the G-cahnnel, thereby completing the centering operation.

FIGS. 4–6 show only a part of the picture signal of each of the channels. Practically speaking, the judgement of centering may be carried out by sampling signals only in a preselected section of picture signals from each of the pickup systems 1–3, which section contains picture signals corresponding to a central portion of the resulting picture image.

The centering operation has been described in the above out of the registration operation. If the sampling section of picture signals is chosen at a peripheral portion of the picture image and it is limited to a small section, offsets resulting from difference in size, linearity, distorsion and the like may be considered to be of the same type. Accordingly, offsets stemming from differences in size, linearity and distorsion may be automatically corrected in the same way as the above-mentioned centering operation. Thus, the overall registration operation can be effected automatically.

It is obviously possible to use any object for obtaining picture signals respectively from the pickup systems 1–3. It is however most preferable to use an object containing both white and block colors predominantly.

In the above embodiment, if the picture signal of the G-channel (reference channel) and that of the R-channel (channel under comparison) are considerably shifted from each other and no overlapping portions are present therebetween as illustrated in the chart (9) and (10), or either one of the picture signals is not obtained as illustrated in the chart (11) and (12), use of Logic (B) gives the same number as the pulse numbers $Y_n$ and $Z_n$ on the basis of the discriminatory signals Y and Z except for the cases shown in the charts (11) and (12) and makes it impossible to perform a judgement. Incidentally, an judgement error occurs in the cases shown in the charts (11) and (12). However, as explained above, the present autoregistration system is employed to correct any registration offset due to differences in use conditions of color television image pickup apparatus, their changes along the passage of time or variations in the surrounding temperature. Accordingly, it is impractical to expect to encounter such a large offset that no overlapping portions are present between the picture signals of each two channels as depicted in the charts (9) and (10). Furthermore, unless the object under shooting has a very special hue (for instance, the object has a monochromatic color of either one of red, green or blue), the picture signal of either one of the channels will hardly be lost as shown in the charts (11) and (12). Therefore, there is almost no danger of unabling to make a judgement or making a judgement error in actually employing the autoregistration system according to this invention.

The above description relates to an registration operation in the horizontal direction, i.e., in the scanning direction on a picture face. Since an registration operation in the vertical direction may be automatically carried out by sequentially reading out picture signals in the vertical direction in a preselected section of the picture face and subjecting the thus-read out picture signals to a processing in the same way as that applied with respect to the aforementioned registration in the horizontal direction, it is possible to peform automatic registration in both horizontal and vertical directions.

Figure 7:
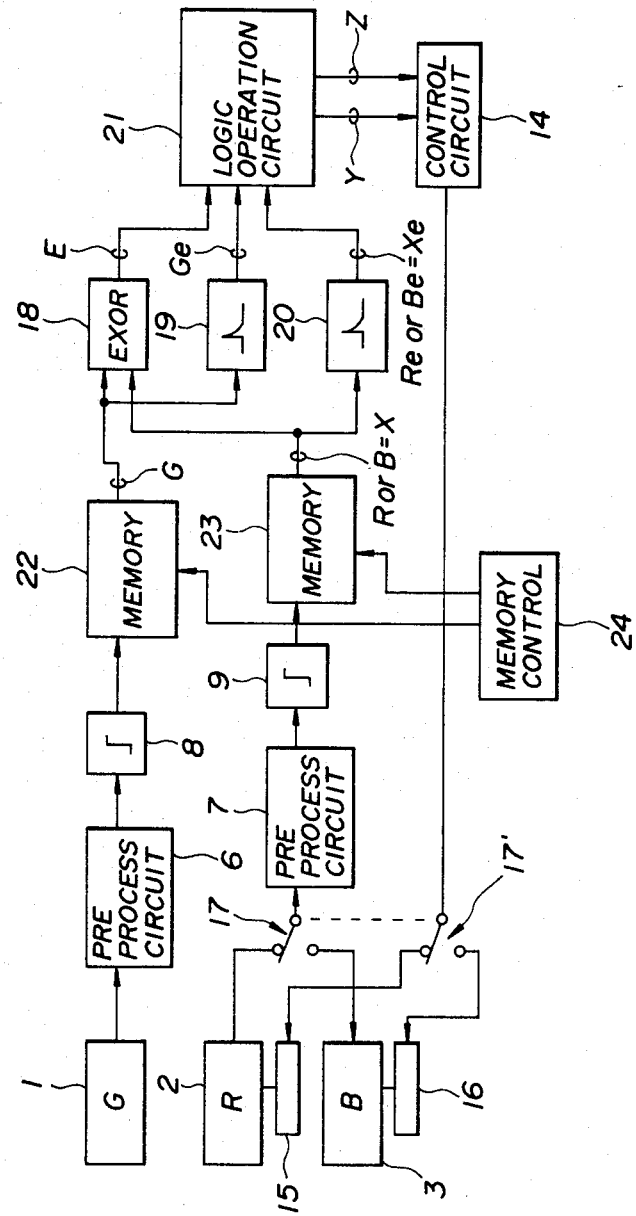
FIG. 7 is a block diagram of another embodiment of the autoregistration system according to this invention.

FIG. 7 illustrates another embodiment of the autoregistration system according to this invention. The system of FIG. 7 is so constructed as to perform with high accuracy the registration in the vertical direction. In FIG. 7, the same circuits, units, elements and the like as those used in the embodiment of FIG. 3 are designated by the same reference numerals and their detailed description will be omitted.

In FIG. 7, numerals 22, 23 represent individually a random access memory (hereinafter called "RAM") and numeral 24 indicates a memory control circuit. The remaining circuits, units, elements and the like are identical to those employed in the embodiment of FIG. 3.

RAMs 22, 23 serve to store binarized picture signals over one frame, i.e, over two fields and permit to read them out as desired.

The memory control circuit 24 controls RAMs 22, 23 and sequentially collect, as samples, binarized picture signals from the horizontal scanning lines in a preselected section of a picture image, which section contains the central portion of the picture image, in a given vertical line chosen for the registration in the vertical direction. These collected picture images are then written over two fields in RAMs 22, 23. Thereafter, the thus-written in binarized picture signals are sequentially read out along the vertical line chosen for the registration in the vertical direction in such a way that the signals in the first field are interlaced with those in the second field, thereby allowing to produce the signals G and X.

As a result, the signals G and X respectively read out from RAMs 22, 23 are combined together in such a way that the horizontal scanning lines in the second field are interlaced with the horizontal scanning lines in the first field. The thus field interlaced picture image is thus identical to a picture image resulting from the field interlaced picture signals corresponding to one frame.

The above field interlace will next be described with reference to FIGS. 8–10.

Figure 8:
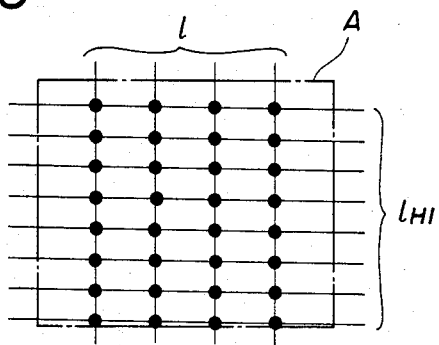
FIGS. 8–10 are each a chart indicating the order in which the system of FIG. 7 produces image components of different colors to provide a composite color television picture image.

FIG. 8 shows a signal arrangement in the first field, for example, in an odd-numbered field. FIG. 9 represents a signal arrangement in the second field, for example, in an even-numbered field. FIG. 10 illustrates a signal arrangement obtained by interlacing both fields into a single frame. The letter A indicates a section preselected at the center of the picture image. Letter l indicates at least one given line chosed in the vertical direction. Letters $l_{H1}$ and $l_{H2}$ indicate respectively horizontal scanning lines in the odd-numbered field and those in the even-numbered field.

Here, the number of the given line l may be chosen as desired. The accuracy of registration can be improved as more vertical lines are used. On the other hand, it will become necessary to increase the capacity of each of RAMs 22, 23 as the number of vertical lines becomes more. In view of these mutually-contradictory aspects, it is necessary to select a suitable number of vertical lines.

Figure 9:
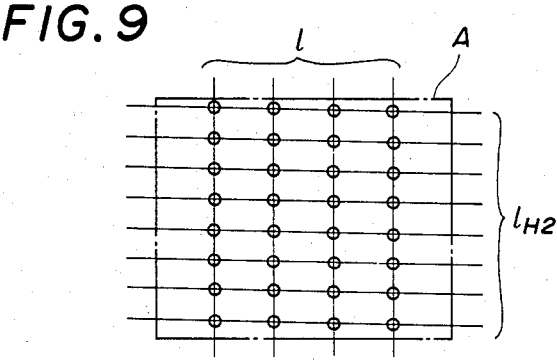

In RAMs 22, 23, the binarized picture signals indicated by black dots in FIG. 8 are written in at prescribed addresses during a period corresponding each odd-numbered field whereas binarized picture signals indicated by circles in FIG. 9 are also written in at prescribed addresses during a period corresponding to each even-numbered field.

Figure 10:
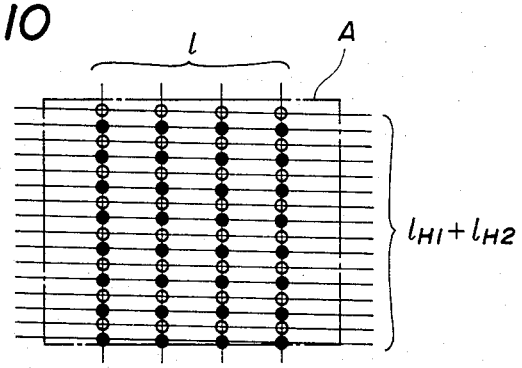

Thereafter, as shown in FIG. 10, the signals indicated by black dots along the given vertical line l in the odd-numbered field and the signals represented by circles along the same give vertical line l in the even-numbered field are alternatingly read out, in other words, in such a state that the signals of the one field is interlaced with that of the other field, as the binarized picture signals G, X from their corresponding addresses.

As apparent from FIG. 10, the signals G, X read out from RAMs 22, 23 are sampled from the picture signals on scanning lines equivalent to one frame.

Then, these signals G, X are fed to the "exclusive or" circuit 18 and edge signal generating circuits 19, 20 and a registration operation is thus carried out in the same way as the embodiment shown in FIG. 3.

As a result, binarized picture signals are sampled for vertical registration from the picture signals corresponding to one frame in the above embodiment, thereby successfully avoiding the reduction in registration accuracy which otherwise takes place when the scanning lines become coarser.

In the above embodiment, signals are interlaced to obtain composite signals corresponding to one frame by writing binarized picture signals corresponding to two fields in RAMs 22, 23 and then reading them out alternatingly depending on field. However, it may be feasible, upon completion of writing-in of the binarized picture signals in one field, to use the signals directly obtained from the binarization circuits 8, 9 as the binarized picture signals of the subsequent field and to read out the unstored signals of the subsequent field and the signals of the former field stored in RAMs 22, 23 alternatingly. This permits to use random access memories of smaller capacity as RAMs 22, 23.

Having now fully described the invention, it will be apparent to one of ordinary skill in the art that many changes and modifications may be made thereto without departing from the spirit or scope of the invention as set forth herein.

What is claimed is:

1. An autoregistration system for a color television camera equipped with a plurality of image pickup devices so as to combine picture signals obtained through the plurality of channels from the plurality of image pickup devices with respect to an object into a composite color television signal, said system comprises:

means for producing a level difference signal representing a predetermined difference to level between the picture signals of desired two channels, between which a picture image registration is to be carried out, and a first and second edge signals corresponding to each of the picture signals of the two channels; and a logic circuit for receiving as inputs the difference signal and first and second edge signals and performing thereon an operational processing represented by the following equations so as to obtain the following two kinds of discriminatory signals Y, Z representing the direction of a registration offset between the picture signals of the two channels $Y = E \cdot Ge + \overline{E} \cdot Xe$ $Z = E \cdot Xe + \overline{E} \cdot Ge$ in which E means the level difference signal and Ge and Xe are respectively the first and second edge signals;

whereby to permit registration of the picture signals without need for any specific registration chart.

2. An autoregistration system as claimed in claim 1, wherein said system comprises:

a memory capable of sampling and storing picture signals along at least one desired vertical sampling line in a preselected section of the picture image corresponding to each of the two channels, between which the picture image registration is to be carried out, over at least one field;

memory control means for reading out, as an independent unit, the picture image signals of the two channels thus stored in the memory while combining them over at least two fields;

means for producing the level difference signal representing the predetermined difference in level between the picture signals of the two channels thus read out from the memory and first and second edge signals corresponding to each of the thus-read out picture signals of the two channels; and the logic circuit for receiving as inputs the level difference signal and first and second edge signals and performing thereon the operational processing to obtain the two kinds of discriminatory signals representing the direction of a vertical registration offset between the picture signals of the two channels.

3. An autoregistration system as claimed in claim 1 or 2, wherein the logic circuit is constructed in such a way that it performs an operational processing represented by the following equations so as to obtain the two kinds of discriminatory signals Y, Z:

$$Y = E \cdot Ge$$

$$Z = E \cdot Xe$$

4. An autoregistration system as claimed in claim 1 or 2, wherein the logic circuit is constructed in such a way that it performs an operational processing represented by the following equations so as to obtain the two kinds of discriminatory signals Y, Z:

$$Y = E \cdot Ge \cdot \overline{Xe} + \overline{E} \cdot Ge \cdot \overline{Xe}$$

$$Z = E \cdot \overline{Ge} \cdot Xe + \overline{E} \cdot Ge \cdot \overline{Xe}$$

5. An autoregistration system as claimed in claim 1 or 2, wherein the former means comprises a first and second binarization circuits receiving the picture signals of the two channels as their inputs, and an "exclusive or" circuit receiving the outputs of the first and second binarization circuits as a first and second inputs, thereby obtaining an output from the "exclusive or" circuit as the level difference signal.

* * * * *

UNITED STATES PATENT AND TRADEMARK OFFICE
CERTIFICATE OF CORRECTION

PATENT NO. : 4,507,678
DATED : MARCH 26, 1985
INVENTOR(S) : KAZUKI IWABE ET AL

It is certified that error appears in the above-identified patent and that said Letters Patent is hereby corrected as shown below:

In column 12, line 6, delete "$Y = E \cdot Ge \cdot \overline{X}e + \overline{E} \cdot Gc \cdot \overline{X}e$" and substitute therefor --$Y = E \cdot Ge \cdot \overline{X}e + \overline{E} \cdot \overline{G}e \cdot Xe$--.

In column 5, line 31, delete "$Z = E \cdot Xe + \overline{E} \cdot Ze$" and substitute therefor --$Z = E \cdot Xe + \overline{E} \cdot Ge$--.

In column 5, line 35, delete "$Z = \overline{E} \cdot \overline{G}e \cdot Xe + E \cdot Ge \cdot \overline{X}e$" and substitute therefor --$Z = E \cdot \overline{G}e \cdot Xe + \overline{E} \cdot Ge \cdot \overline{X}e$--.

Signed and Sealed this

Fifteenth Day of October 1985

[SEAL]

Attest:

Attesting Officer

DONALD J. QUIGG

Commissioner of Patents and
Trademarks—Designate